US008078989B2

(12) United States Patent (10) Patent No.: US 8,078,989 B2
Parkinson (45) Date of Patent: Dec. 13, 2011

(54) INTERNET ACCESS GUI FOR MOBILE DEVICES

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 779 days.

(21) Appl. No.: 12/074,177

(22) Filed: Feb. 29, 2008

(65) Prior Publication Data

US 2009/0222721 A1    Sep. 3, 2009

(51) Int. Cl.
    *G06F 17/00* (2006.01)
(52) U.S. Cl. ........ 715/800; 715/206; 715/209; 715/716; 715/762; 715/765; 715/769; 715/760
(58) Field of Classification Search ................. 715/737, 715/750, 788–826, 855
    See application file for complete search history.

(56) References Cited

U.S. PATENT DOCUMENTS

| 6,925,481 | B2 | 8/2005 | Singhal et al. |
| 6,925,595 | B1* | 8/2005 | Whitledge et al. ............ 715/234 |
| 6,963,972 | B1* | 11/2005 | Chang et al. .................. 713/153 |
| 2003/0070143 | A1* | 4/2003 | Maslov ......................... 715/513 |
| 2004/0088647 | A1* | 5/2004 | Miller et al. ................... 715/500 |
| 2006/0080664 | A1* | 4/2006 | Jawahar et al. ............... 718/100 |
| 2006/0282445 | A1* | 12/2006 | Chen et al. .................... 707/100 |
| 2007/0100653 | A1* | 5/2007 | Ramer et al. ..................... 705/1 |

OTHER PUBLICATIONS

Chirag Patel ("A Scalable Software Architecture for Platform-Independent User interface" Published May 2004 pp. 1-108).*

* cited by examiner

*Primary Examiner* — Quoc A Tran
(74) *Attorney, Agent, or Firm* — Lowenstein Sandler PC

(57) ABSTRACT

An apparatus and system for transforming a web page for display on a mobile device is described. In one embodiment, a graphical representation of a document object model associated with a URL is displayed. Selections of at least one element of the document object model are stored as a content filter. A request for a resource associated with the content filter is processed by extracting portions of the resource according to the content filter. The extracted portions are provided to a client.

11 Claims, 6 Drawing Sheets

INTERNET ACCESS GUI FOR MOBILE DEVICES

FIELD

The invention relates to mobile Internet access. More specifically, the invention relates to data preparation methods to improve the usability of Internet data resources accessed from devices of limited capability.

BACKGROUND

The amount of information and the number of services available to systems with Internet access is large, and is likely to continue to grow. So too is the accessibility of the information and services: wired and wireless infrastructure roll-outs bring TCP/IP connectivity to more and more remote areas. This growth in content and availability is mirrored by increases in the number and types of devices that use the content. As the likelihood of a device operating where Internet access is available increases, and the cost of such access decreases, the balance of a cost/benefit analysis shifts in favor of adding network-access hardware and structuring software to use—or even to rely on—Internet-based functionality.

One issue that complicates the general trend towards more, and more available, online information and services, is the limited resources available to some systems that could benefit from the information. In the main, Internet resources are developed to be useful and attractive to users of at least moderately-capable computer systems (e.g., desktop personal computers). Information providers expect their creations to be viewed on a display of at least a certain size or resolution, by a user with a keyboard and a mouse or other pointing device; and may not devote much effort to reducing client memory or computational requirements. Efforts to provide alternate and lighter-weight interfaces often suffer due to a lack of viable economic support models. For example, a news website that relies on advertising to support its data collection, editing and service infrastructure, may not be able to find a revenue stream to support the maintenance of a low-bandwidth, text-only version of the website for computational devices that lack a large screen and/or a full set of user interface devices.

New approaches to online data processing may be able to bring more information to more people.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Although the most advanced mobile devices of any technology generation may have capabilities only marginally inferior to contemporary fixed devices, mobile systems generally have smaller and lower-resolution displays, slower processors, less memory, and fewer user-input options. In addition, all mobile systems must carefully consider the power implications of supported actions, since battery life is often important to users. Embodiments of the invention facilitate the construction and use of content filters to improve the efficiency with which a mobile device's resources are used, and furthermore establish an economic model within which the creation and use of the filters is encouraged.

Figure 1:
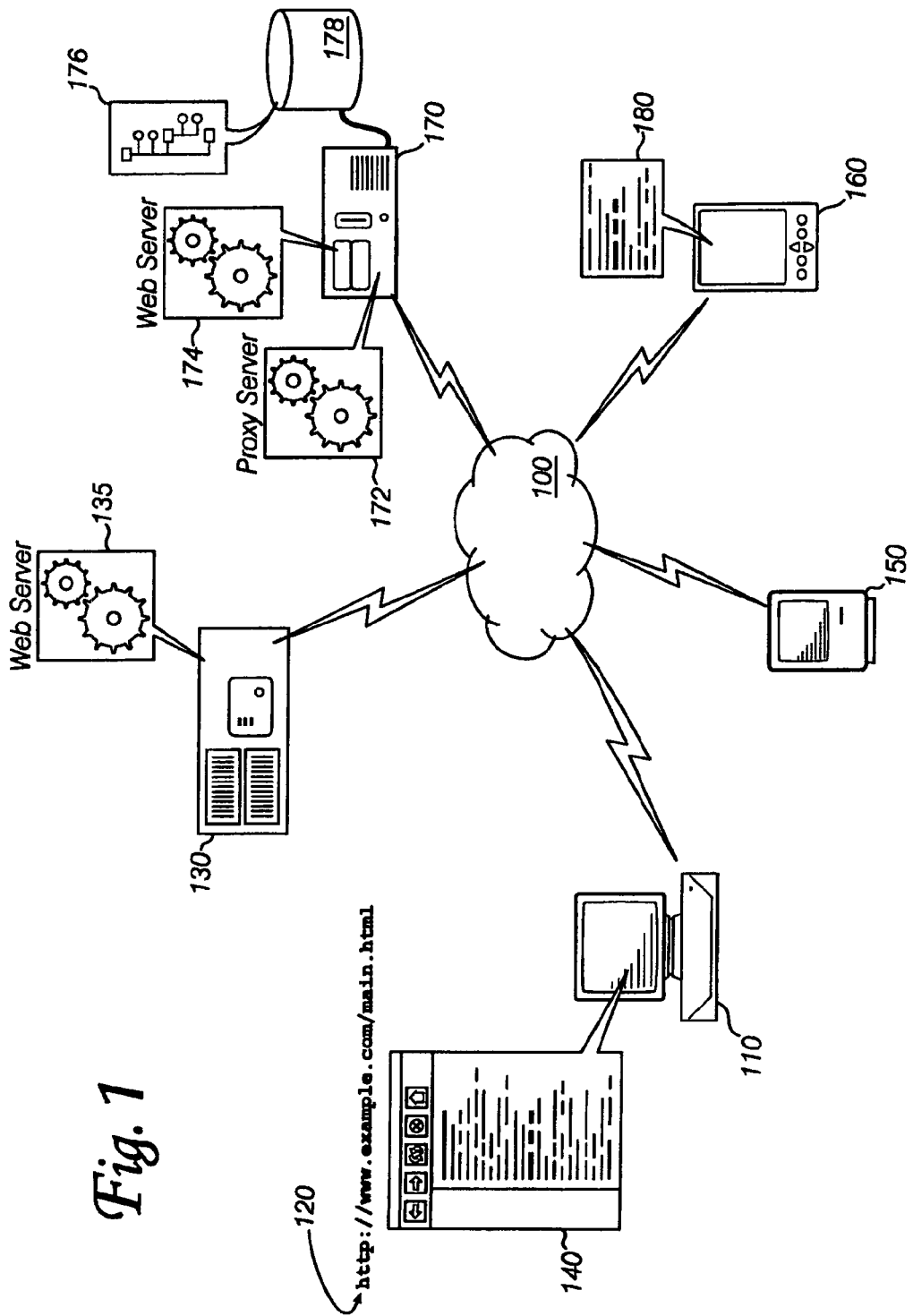
FIG. 1 is a block diagram illustrating one embodiment of a system for graphically displaying web sites on mobile devices.

FIG. 1 is an overview of participants and interactions according to embodiments of the invention. Centrally-located "cloud" 100 represents a distributed data communication network such as the Internet. Various computers are shown connected to network 100, and it is assumed that these may communicate and interact as described below. As is well-known in the art, a user at computer 110 may enter a Uniform Resource Locator ("URL") 120 to cause the computer to retrieve and display information from a remote system 130. Software such as web server 135 may receive, process and respond to a request from client computer 110. Software at computer 110 (e.g., "browser" software), interprets the information from web server 135 and produces a corresponding display 140.

A user of mobile system 160 may wish to view the same information (identified by URL 120), but system 160 may lack the hardware capacity to display or interact with the complete resource. Thus, according to an embodiment of the invention, system 160 communicates with a "helper" system 170 to obtain information that will permit system 160 to display a simplified version 180 of display 140. System 160 may, for example, ask proxy server 172 to retrieve the data corresponding to URL 120, edit or filter out excessively complex material, and return only the information necessary to prepare simplified display 180. In another embodiment, system 160 may retrieve some auxiliary information from a web server 174, and the complete resource from web server 135, and perform the filtering and editing itself. The auxiliary information used by proxy server 172 or by mobile system 160 includes a document object model ("DOM") 176, which may be stored in a database 178 at system 170.

Figure 2:
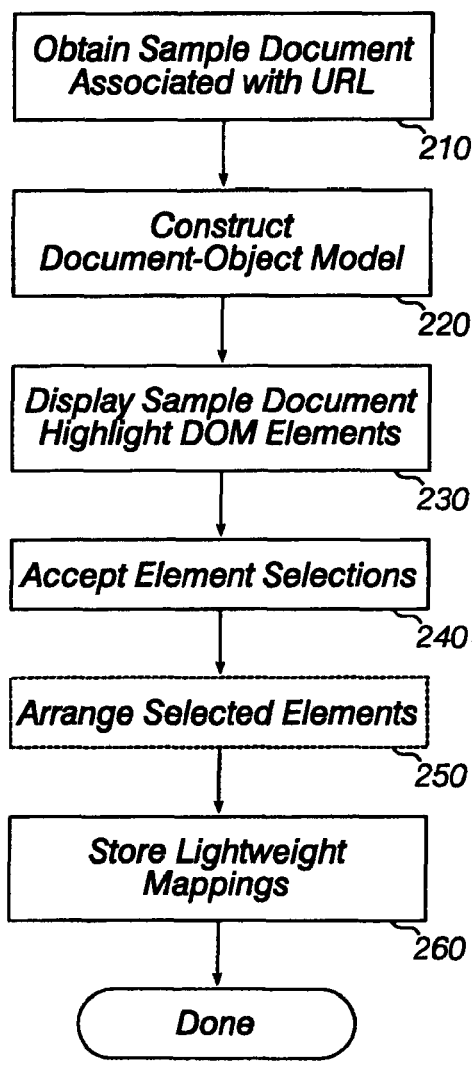
FIG. 2 is a flow diagram illustrating one embodiment of a method for building a template.
Figure 3:
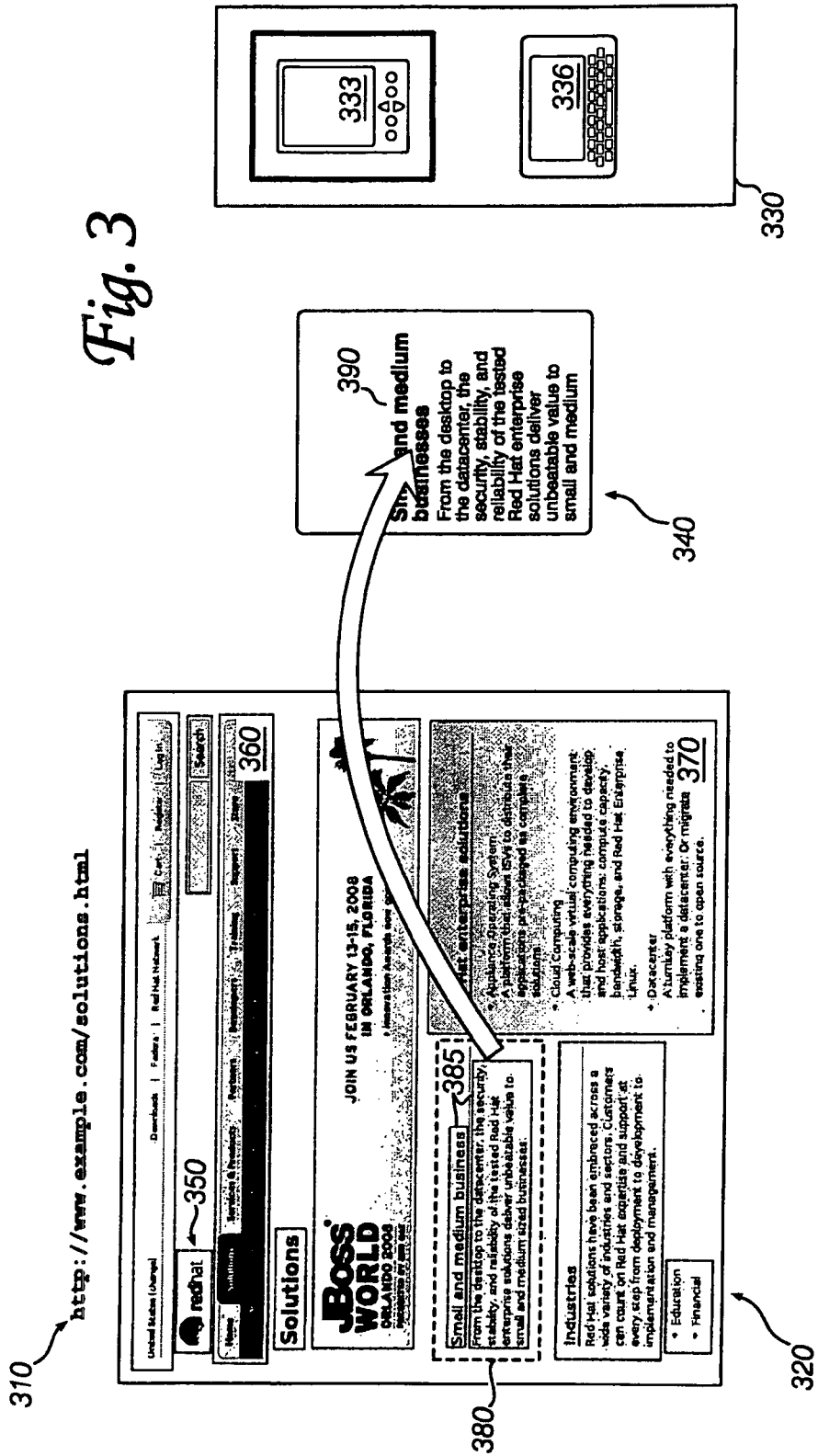
FIG. 3 is a block diagram illustrating one embodiment of a construction of a document-object model.

FIG. 2 outlines a method used by some embodiments of the invention to build a template that can subsequently be used to prepare "lightweight" versions of Internet-accessible resources for presentation on mobile network devices. FIG. 3 shows some features of a user interface of a general-purpose computer that is operable to perform the method. First, a sample document associated with a Uniform Resource Locator ("URL") is obtained (210; see also FIG. 3, URL 310 and corresponding document 320). A Document-Object Model ("DOM") is constructed based on the sample document (220). The DOM encodes or represents features of the sample document that affect the appearance or layout of the document within a display window, considered separately from the textual or graphical information the document contains. For example (referring to FIG. 3), the DOM may indicate that the displayed document has a small image 350 placed above a navigation header 360, or that a "sidebar" 370 containing certain information is to appear to the right of a short paragraph of information 380. A DOM is often a hierarchical structure. In the sample document shown in FIG. 3, for example, paragraph 380 has two sub-portions 385 (a header and an associated sentence). DOM elements may correspond directly to images, buttons, headers and paragraphs, or to groups of such elements having a common theme or intended usage.

The display presented to the user highlights related DOM elements (230). FIG. 3 indicates this highlighting by dashed lines surrounding various portions of the sample document. In some embodiments, highlighting may be dynamic. For example, a colored border or background may be illuminated when the user positions a mouse cursor or other pointing device over a corresponding portion of the sample document, and extinguished when the cursor is moved away.

Next, an embodiment accepts the user's selections of DOM elements that are to be included in the lightweight version of the resource (240). Some embodiments may also permit the user to position the selected elements on a simulated display of a mobile device (250). Referring again to FIG. 3, DOM element 380 has been "dragged" to simulated display 340, where it appears as element 390.

When the user has selected (and optionally arranged) the desired portions of the resource to be displayed on the mobile device, information about these selections is stored in a database for subsequent use (260). The process outlined in the flow chart of FIG. 2 may be repeated for other input URLs and their corresponding resources, or to prepare another arrangement for a mobile device with a different screen aspect ratio. For example, element 330 of FIG. 3 shows how an embodiment can offer a choice of a plurality of mobile devices 333 and 336 that may be selected as a target device. Simulated display screen 340 may mimic the size, aspect ratio, resolution and color depth of the selected device so that the user can easily evaluate whether the information chosen from the full resource display 320 will be useful when presented on the target device's screen.

It is important to recognize that the process described above is not simply preparing a stripped-down version of a web page to be presented on a small display screen. Instead, the process allows a user to interact with the Document Object Model that is either implicit or explicit in a document identified by a URL. This is useful because the same DOM is often re-used to present different information. When this occurs, the template created according to an embodiment of the invention can be used to select desired material from a new page. As a concrete and practical example, consider a template based on the main page of a newspaper's web site. The page may use the same format (the same DOM) every day, but may replace the information in the headlines and body text according to the news of the day. A template prepared as discussed can be used to identify the portions of the front page that are useful to display on the mobile device screen, and any day's news can be retrieved and viewed by the mobile device user.

Figure 4:
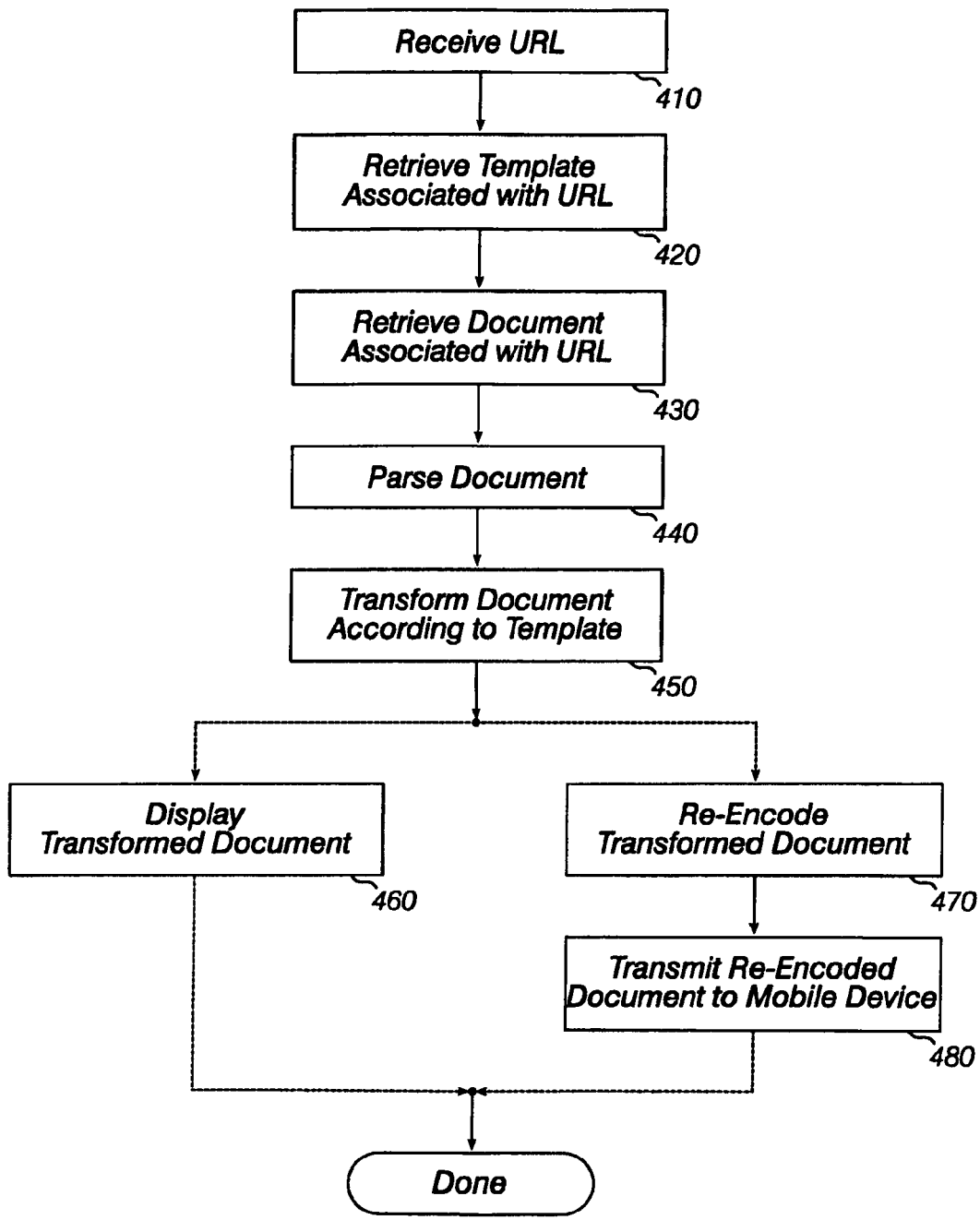
FIG. 4 is a flow diagram illustrating one embodiment of a method for transforming a document according to a template.

FIG. 4 outlines the use of one of these templates to present information to a user. The process begins with the selection of a URL (410). The user may type (or otherwise enter) the URL, or may select a hyperlink (e.g., in an electronic mail message or on Web page) to initiate these activities. A template associated with the URL is retrieved (420), as is the document associated with the URL (430). The document may be, for example, a Hypertext Markup Language ("HTML"), Extensible Markup Language ("XML") or Standard Generalized Markup Language ("SGML") document, containing both textual content and "markup"—information to control the (automated) interpretation or presentation of the textual content.

The document is parsed (440) to create data structures revealing its logical structure. These data structures are related to the Document Object Model. For example, headers, paragraphs, captions, lists and tables may all be identified during parsing. In addition, presentation-related information such as line heights, beginning and ending locations, fonts, colors, etc., may be computed or otherwise determined. The document is transformed under the control of the template retrieved earlier (450) to produce a new document containing at least some of the original material. The transformation may be performed in data-structure space. That is, the template may be applied to the data structures created by parsing the original document, to produce a different set of data structures.

Finally, in some embodiments, the transformed document is displayed (460). In other embodiments, the transformation is performed by an intermediate system, so the transformed document is re-encoded (470) and transmitted to a mobile device (480) which is to display the document.

The foregoing figures and description relate to the preparation and use of content filters or templates, which direct the transformation of a first structured document such as a Web page into a second document that is suitable for display on a device of limited capability, such as a hand-held computer or cellular telephone. By creating and using templates that manipulate documents based on their Document Object Models, the effort invested in preparing a template pays off proportionately to the number of documents that use the same DOM, since all of these documents can be processed by the same template.

An embodiment of the invention may also include a broader system that functions to encourage the development of newer and better content filters. Since, in many instances (and as described above), filters are created manually, such encouragement is vital to the long-term sustainability of such a system. Traditional revenue models for supporting information delivery systems, such as subscription, pay-per-view and advertising, have not met with much success in small, non-homogeneous markets. This presents a problem for content-filtering systems like those described here, because templates tend to be fairly- to highly-specific to a DOM and a particular mobile device, and because advertising material is often eliminated when a document is simplified and rearranged for display on a small screen. The natural communities of interest do not align so that it is to anyone's clear economic benefit to produce and maintain content filters.

For example, web site operators may tolerate accesses from viewers that strip revenue-generating advertisements, but they are unlikely to affirmatively aid such access. Furthermore, the operator of a first site has little incentive to prepare the many templates required to support many different mobile devices, and no incentive to prepare templates that would make another website's content available. Users of one type of device are mainly interested in templates for that type of device, and in templates for processing the particular resources they wish to use. A manufacturer of a device has some incentive to provide templates that make the device more useful, but it is impractical to expect such a manufacturer to produce filters for the range of resources that its customers might wish to access. In other words, none of the information providers, consumers, or mobile device manufacturers has a clear incentive to produce and maintain content filters for more than a small portion of the resources and target devices.

The Creative Commons and Open Source movements have demonstrated that collaborative, volunteer-driven development of information resources is a viable model. Such content (including literary, artistic, and reference materials, as well as computer software) regularly rivals, and often exceeds, the quality of commercial equivalents. An embodiment of the invention adapts some Open Source techniques to address the problem at hand.

Figure 5:
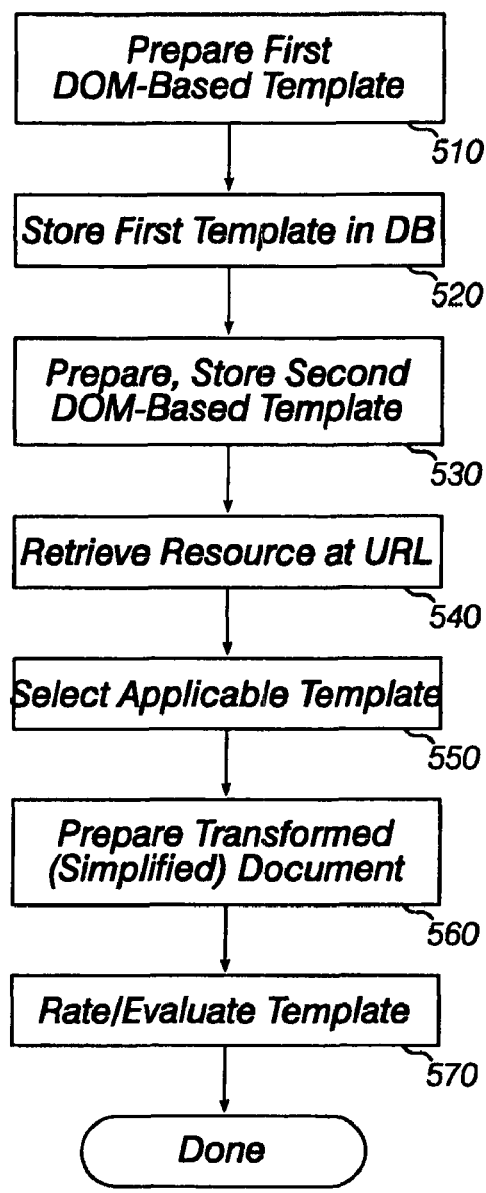
FIG. 5 is a flow diagram illustrating one embodiment of a method for evaluating a template based on collaboration and reputation-driven content filter development.

FIG. 5 outlines a method used in a collaborative, reputation-driven content filter development, distribution and application system according to an embodiment of the invention. The system interacts with several different classes of users (both human and machine clients) and consequently presents several different interfaces. It can be structured as a monolithic software application, or built up of a combination of cooperating applications such as databases, web servers and network proxies.

A DOM-based template is prepared by a first participant (510). For example, software implementing a method like that described in reference to FIG. 2 could be used to prepare the template. This template is stored in a database (520), keyed by the URL corresponding to the sample document upon which the template is based. The database may assign a unique identifier to the template, and may store information such as the identity of the first participant, the date when the template was prepared and/or parameters of the mobile device targeted by the template.

A second template for the same URL is also prepared (perhaps by a second participant; perhaps based on a modification of the first template) and stored in the database (530). Later, a third participant retrieves the resource at the URL using a mobile device (540). One of the templates is selected (550) and a method like that described in reference to FIG. 4 is used to prepare a transformed (e.g., simplified) version of the resource (560) for display on the mobile device. Finally, the third participant may submit an evaluation or rating of the template (570). Alternatively, the rating of a template may be based on automatically-collected data such as the number of times the template has been used. This rating affects the selection operation 550 when subsequent participants retrieve the URL.

FIG. 5 presents a necessarily high-level overview of the operation of a system to create, provide/use and evaluate DOM-based templates. A successful implementation requires a balancing of features and details to obtain long-term community involvement. The balance may change over time: for example, financial or other incentives may be necessary to jump-start an implementation, but later, a reputation system may suffice, or a quid-pro-quo approach may serve. Combinations of these approaches may also be employed.

An implementation may offer a financial incentive to users who create, modify or evaluate content templates. The incentive may be a direct monetary payment, a credit that can be exchanged for goods or services from selected vendors, or an in-kind allowance against charges incurred for using templates. (Accordingly, in some embodiments, the system may require payment of some sort in return for access to the template, or for the service of transforming a resource to a simpler form for display on a mobile device.)

In another embodiment, users who create or improve content-filtering templates may collect reputation points based on the ratings of those templates by users (or simply on the number of times that each template is used). Templates from highly-ranked users may be selected in preference to templates from less-famous users. (In other words, the reputation of the creator of a template contributes to the likelihood that the template will be selected from a set of templates for processing a particular URL.)

A system may provide incentives (financial, reputation, or other) merely for using the templates to transform resources, and larger incentives for providing feedback on the templates in the form of ratings or rankings.

Figure 6:
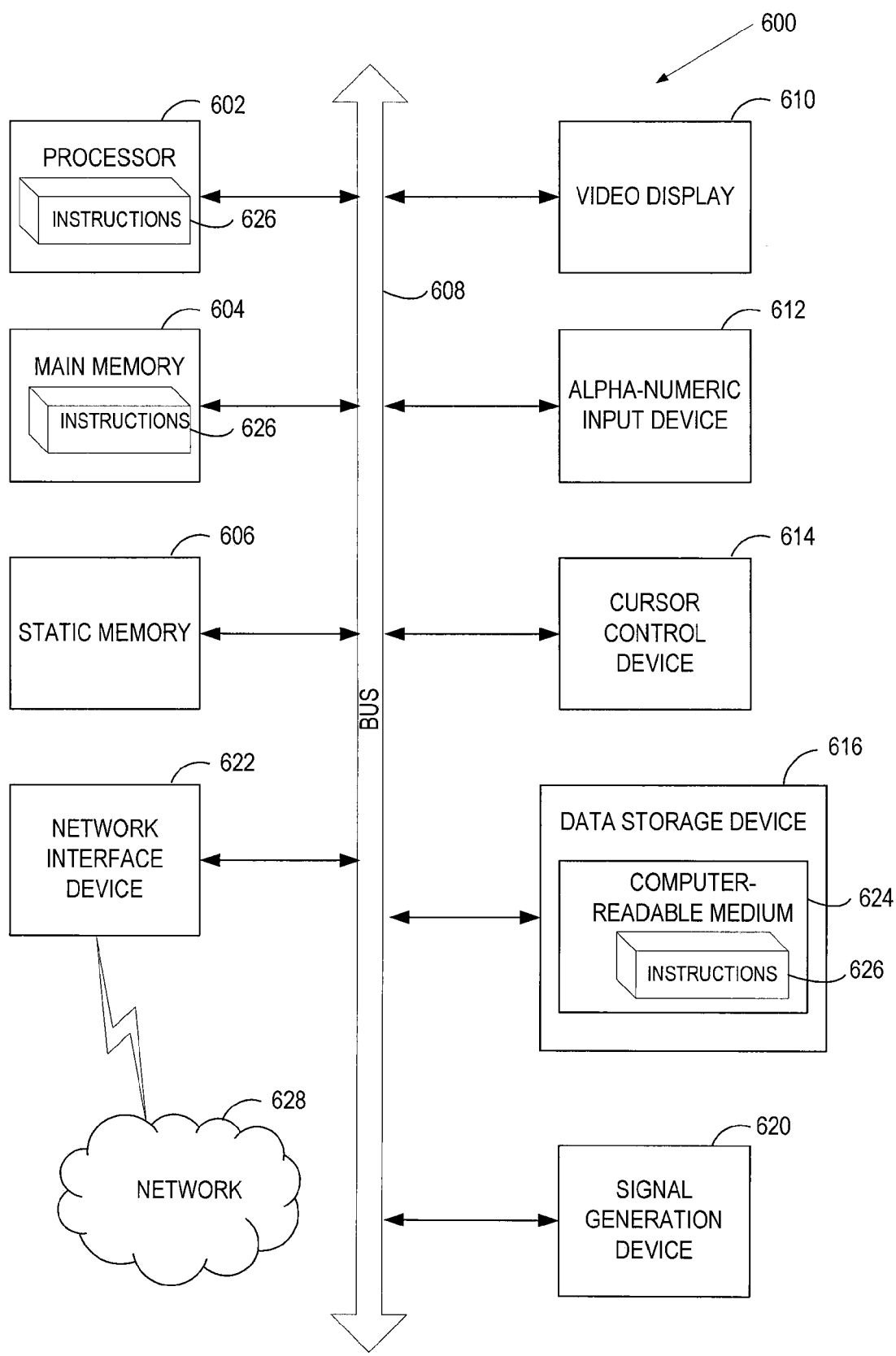
FIG. 6 is a block diagram illustrating an example of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 616, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a machine-accessible storage medium 624 on which is stored one or more sets of instructions (e.g., software 626) embodying any one or more of the methodologies or functions described herein. The software 626 may also reside, completely or at least partially, within the main memory 604 and/or within the processing device 602 during execution thereof by the computer system 600, the main memory 604 and the processing device 602 also constituting machine-accessible storage media. The software 626 may further be transmitted or received over a network 628 via the network interface device 622.

While the computer-accessible storage medium 624 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media, and carrier wave signals.

In the foregoing description, numerous details were set forth. It will be apparent, however, to one skilled in the art, that the present invention may be practiced without these specific details. In some instances, well-known structures and devices were shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "sending," "receiving," "attaching," "forwarding," "caching," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention was not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that systems to design and deliver customized documents by preparing and applying Document Object Model-based templates, and system to evaluate and rank such templates, can be implemented by software and hardware that distribute the functions of embodiments of this invention differently than herein described. Such variations and implementations are understood to be captured according to the following claims.

The invention claimed is:

1. A method comprising:
   displaying a graphical representation of a document object model of a document;
   accepting selections of at least one element of the document object model and a position of the at least one element of the document object model on a simulated display device of a mobile device, the simulated display device mimicking one or more characteristics of a target device;
   storing the selections of the at least one element of the document object model and the position of the at least one element of the document object model on the simulated display as a content filter,
   wherein the content filter is stored as a filter template and being associated with one of a plurality of document object model (DOM)-based templates pertaining to a Uniform Resource Locator (URL);
   processing a request for a resource associated with the content filter;
   extracting portions of the resource according to the content filter;
   providing the extracted portions to a client, the extracted portions being arranged according to the content filter; and
   ranking the plurality of DOM-based templates associated with the URL based on reputation points of one or more users involved in a creation of each of the plurality of DOM-based templates, the reputation points depending on usage data of a corresponding DOM template.

2. The method of claim 1 further comprising: highlighting one or more elements from the document object model on the graphical representation based on a hierarchical structure of the elements, the elements based on a layout of the graphical representation of the document object model.

3. The method of claim 1 further comprising: accepting a selection of the mobile device from a plurality of mobile devices as a target device for the client; and providing the simulated display of the extracted portions based on the selected mobile device and the selection position.

4. The method of claim 1 wherein the resource includes a web page associated with the URL, the client includes a mobile device, one element corresponding to a logical structure of the web page.

5. The method of claim 1 wherein the DOM-based template includes a graphical representation based on a hierarchical structure of elements in the DOM-based template, the elements based on a layout of the graphical representation of the DOM-based template.

6. A system comprising:
one or more storage devices to host a database associating Uniform Resource Locators ("URLs") with Document-Object Model ("DOM") templates to control transforming a structured document at a URL into a related structured document for display on a mobile device;
a processor, coupled to the storage devices;
a template delivery system, executed by the processor, to provide a DOM template corresponding to a URL, the DOM template identifying selections of at least one element of a DOM and a position of the at least one element of the DOM on a simulated display device of the mobile device, the simulated display device mimicking one or more characteristics of a target device; and
a rating system, executed by the processor, to rank a plurality of DOM templates associated with one URL based on reputation points of one or more users involved in a creation of each of the plurality of DOM-based templates, the reputation points depending on usage data of a corresponding DOM template.

7. The system of claim 6 wherein an element of the DOM template corresponds to a logical structure of the structured document, the structured document including a web page associated with the URL.

8. The system of claim 6 wherein the DOM templates include a graphical representation based on a hierarchical structure of elements in the DOM template, the elements based on a layout of the graphical representation of the DOM template.

9. A non-transitory computer-readable medium having executable instructions to cause a computer to perform a method comprising:
displaying a graphical representation of a document object model of a document;
accepting selections of at least one element of the document object model and a position of the at least one element of the document object model on a simulated display device of a mobile device, the simulated display device mimicking one or more characteristics of a target device;
storing the selections of the at least one element of the document object model and the position of the at least one element of the document object model on the simulated display as a content filter, wherein the content filter is stored as a filter template and being associated with one of a plurality of document object model (DOM)-based templates pertaining to a Uniform Resource Locator (URL);
processing a request for a resource associated with the content filter;
extracting portions of the resource according to the content filter;
providing the extracted portions to a client, the extracted portions being arranged according to the content filter; and
ranking the plurality of DOM-based templates associated with the URL based on reputation points of one or more users involved in a creation of each of the plurality of DOM-based templates, the reputation points depending on usage data of a corresponding DOM template.

10. The computer-readable medium of claim 9 wherein the method further comprises: highlighting one or more elements from the document object model on the graphical representation based on a hierarchical structure of the elements, the elements based on a layout of the graphical representation of the document object model.

11. The computer-readable medium of claim 9 wherein the method further comprises: accepting a selection of the mobile device from a plurality of mobile devices as a target device for the client; and providing the simulated display of the extracted portions based on the selected mobile device and the selection position.

* * * * *